(12) United States Patent
Waymouth et al.

(10) Patent No.: US 6,380,125 B1
(45) Date of Patent: Apr. 30, 2002

(54) CATALYSTS FOR THE SYNTHESIS OF ALTERNATING ETHYLENE/ALPHA-OLEFIN COPOLYMERS

(75) Inventors: Robert Waymouth; Margrete K. LeClerc, both of Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/672,108

(22) Filed: Sep. 27, 2000

Related U.S. Application Data

(62) Division of application No. 09/114,714, filed on Jul. 13, 1998, now Pat. No. 6,184,317.
(60) Provisional application No. 60/052,414, filed on Jul. 14, 1997.

(51) Int. Cl.$^7$ .............................. B01J 31/38; C08F 4/64
(52) U.S. Cl. ..................... 502/152; 526/160; 526/943
(58) Field of Search ................................ 526/127, 160, 526/943; 502/152

(56) References Cited

U.S. PATENT DOCUMENTS 5,631,202 A * 5/1997 Ewen ........................ 502/117

FOREIGN PATENT DOCUMENTS

EP  0 632 066 A1  1/1995

OTHER PUBLICATIONS

Razavi et al., JOMC, Elsevier, 520, 1996, pp. 115–120.*
Razavi et al., JOMC, Elsevier, 497, 1995, pp. 105–111.*
Angew. Chem. Intl. Ed. 1998, 37, No. 7.

* cited by examiner

Primary Examiner—David W. Wu
Assistant Examiner—R. Harlan
(74) Attorney, Agent, or Firm—Jacques M. Dulin, Esq.; Innovation Law Group

(57) ABSTRACT

Catalysts, catalyst systems and processes for production of alternating copolymers of ethylene and alpha olefins, and to novel classes of atactic and isotactic alternating copolymers of ethylene and alpha olefins, which copolymers include a wide range of crystallinity and exhibit commercially useful properties. Appropriate selection of ligand substituents permit the catalysts to be symmetric or assymetric, resulting in atactic, or isotactic or atactic, respectively, alternating copolymers of ethylene with alpha olefins. The novel class of bridged flourenyl metallocene catalysts of the invention is assymetric structural form interconvert between states during polymerization of ethylene with alpha olefins to produce alternating isotactic or atactic copolymers. Exemplary metallocene components of the inventive catalyst systems comprised bridged cyclopentadienly-fluorenyl complexes of the general formula:

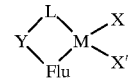

in which: M is a Group 3, 4 or 5 Transition metal, a Lanthanide or an Actinide; X and X' are the same or different uninegative ligands; L is a substituted or unsubstituted cyclopentadienyl (Cp) or indenyl ligand; Flu is a substituted or unsubstituted fluorenyl ligand; and Y is a bridging group. When the Cp ligand is symmetric, atactic alternating E/α-olefin copolymers are produced and when the Cp ligand is assymetric, alternating isotactic or atactic E/α-olefin copolymers are produced.

4 Claims, No Drawings

CATALYSTS FOR THE SYNTHESIS OF ALTERNATING ETHYLENE/ALPHA-OLEFIN COPOLYMERS

CROSS REFERENCE TO RELATED APPLICATIONS

This is the Regular application of Provisional application Ser. No. 60/052,414 filed Jul. 14, 1997 by us for "Alternating Ethene/Propene Copolymerization with $Me_2C(3-RCp)$ (Flu)$ZrMe_2$/MAO", the benefit of the filing date of which is hereby claimed under 35 USC Section 119. This application is also a divisional of U.S. Pat. No. 09/114,714 now U.S. Pat. No 6,184,317 filed Jul. 13, 1998.

NOTICE OF GOVERNMENT RIGHTS

This invention was made with the U.S. Government support under ATP grant 70NANB5H1140 awarded by the National Institute of Standards and Technology.

TECHNICAL FIELD

The invention relates to catalysts, catalyst systems and processes for production of alternating copolymers of ethylene and alpha olefins, and to novel classes of atactic and isotactic alternating copolymers of ethylene and alpha olefins, which copolymers will include a wide range of crystallinity and exhibit commercially useful properties.

BACKGROUND

The copolymerization of ethylene with alpha olefins using transition metal catalysts is well known. Metallocene catalysts have recently proven useful for olefin copolymerization as copolymers produced with metallocene catalysts tend to have more random comonomer distributions and better compositional homogeneity than copolymers produced with heterogeneous catalysts (H. H. Brintzinger, D. Fischer, R. M ülhaupt, B. Rieger, R. M. Waymouth, *Angew. Chem., Int. Ed. Engl.* 1995, 34, 1143). The properties of olefin copolymers depend on not only the relative amounts of the comonomers but on the sequence distribution of the comonomers along the polymer chain and, for copolymers containing alpha olefins, on the stereochemistry of the copolymers. While metallocene catalysts have proven useful for the synthesis of olefin copolymers with random distributions of comonomers along the chain there is a need for catalyst systems which can produce olefin copolymers with a specific non-random comonomer distribution.

Atactic alternating copolymers are known. Chien et al reported that achiral bridged bis flourenyl metallocenes yield very low $r_1r_2$ values for ethylene/propylene copolymerization, although they do not report any production of alternating copolymers (Yu, Z.; Marquez, M.; Rausch, M. D.; Chien, J. C., *J. Polym. Sci. Part A: Polym. Chem.* 1995, 33, p 2795–2801). Galimberti report the synthesis of elastomeric ethylene/propylene copolymers with alternating structures in the presence of achiral bridged bisflourenyl metallocenes (Galimberti, M. Resconi, L.; Albizzati, E. Eur. Pat. Appl. EP 632,066, Jan. 4, 1995). In addition, Uozumi et al. report that achiral bis indenyl catalysts yield alternating ethylene/octene copolymers. (Uozumi, T.; Miyazawa, K.; Sano, T.; Soga, K., *Macromol. Rapid, Commun.* 1997, 18, p. 883–889. Since all of these catalysts are achiral any resulting polymers would be atactic.

Crystalline alternating copolymers are known for comomoners that are not readily homopolymerized. For example, Natta reported that using a $VCl_4/AlR_3$ catalyst cyclopentene can be copolymerized with ethylene to give crystalline (and probably isotactic) alternating ethylene/cyclopentene copolymers (Natta, G.; Dall'Asta, G.; Mazzanti, G.; Pasquon, I.; Valvassori, A.; Zambelli, A., *Makromol. Chem.* 1962, 54, p. 95–101.) Harrington reports that crystalline copolymers of ethylene/cyclic olefins can be prepared with bridged monocyclopentadienyl-amido metallocenes (Harrington, B. A. PCT WO 96/40806, Dec. 19, 1996). Harrington does not report the tacticity of the copolymers produced. Xu reports that crystalline isotactic alternating ethylene/stryrene copolymers can be prepared with certain bridged monocyclopentadienyl-amido metallocenes (Xu, G. *Macromolecules*, 1998, 31, 2395,2402.)

Thus there is a need for catalysts systems that are able to readily copolymerize alpha olefins and ethylene to give alternating isotactic ethylene/alpha olefin copolymers.

THE INVENTION

Summary, Objects and Advantages

It is among the objects and advantages of the invention to provide methods of selecting metallocene catalyst symmetries for production of two novel classes of copolymers of ethylene with alpha olefins which have alternating structures, a first class of atactic alternating copolymers and a second class of isotactic alternating copolymers, which copolymers exhibit a wide range of crystallinity and accordingly a wide range of interesting and useful properties. It is another object and advantage of the invention to provide methods of making and use of a class of fluorenyl bridged metallocene catalysts, which by appropriate selection of ligand substituents in accord with the teachings of the invention may be symmetric or assymetric, resulting in atactic, or isotactic or atactic, respectively, alternating copolymers of ethylene with alpha olefins which exhibit a wide range of commercially useful properties. It is still another object and advantage of the invention to provide a novel class of bridged fluorenyl metallocene catalysts which in assymetric structural form interconvert between states during polymerization of ethylene with alpha olefins to produce alternating isotactic or atactic copolymers. Still other objects and advantages will be evident from a detailed consideration of the specification, formulas, schemes, and claims of this application, and from the inherent characteristics and properties of the polymers described herein and which are produceable from the catalysts hereof in accord with the processes herein described.

The invention is directed to novel processes and catalysts for the production of alternating copolymers of ethylene and alpha olefins. A degree of alternation of up to 83% is easily obtained and higher degrees of alternation with these polymerization systems are indicated. Another aspect of this invention are processes for producing novel classes of isotactic or atactic alternating copolymers of ethylene and alpha olefins, the presence or not and degree of tacticity of which is controlled by the symmetry (or assymetry) of at least one of the ligands.

In a broad aspect, the invention relates to catalysts and processes for the alternating copolymerization of ethylene and alpha olefins. The catalyst systems of the present invention encompass bridged metallocene complexes in the presence of a cocatalyst. Exemplary metallocene components comprise bridged cyclopentadienyl-flourenyl complexes of the general formula:

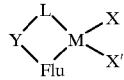

Formula 1 in which: M is a Group 3, 4 or 5 Transition metal, a Lanthanide or an Actinide; X and X' are the same or different uninegative ligands, such as but not limited to hydride, halogen, hydrocarbyl, halohydrocarbyl, amine, amide, or borohydride substituents (preferably halogen, alkoxide, or $C_1$ to $C_7$ hydrocarbyl); L is a substituted or unsubstituted cyclopentadienyl (Cp) or indenyl ligand; Flu is a substituted or unsubstituted fluorenyl ligand; and Y is a bridging group. Exemplary preferred Transition Metals include Titanium, Hafnium, Vanadium, and, most preferably, Zirconium. An exemplary Group 3 metal is Yttrium, a Lanthanide is Samarium, and an Actinide is Thorium.

The ligand L may be any mononuclear or polynuclear hydrocarbyl or silahydrocarbyl ring, typically at least a mono-substituted cyclopentadienyl ring. Preferably L has the formula:

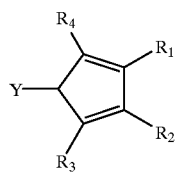

Formula 2 where $R_1$ is a substituted or unsubstituted alkyl, alkylsilyl or aryl substituent of 1 to about 30 carbon atoms, and $R_2$–$R_4$ are the same or different hydrogen or substituted or unsubstituted alkyl, alkylsilyl or aryl substituents of 1 to about 30 carbon atoms, and any adjacent pair of $R_1$–$R_4$ may be connected in a ring.

A particularly preferred group of bridged Cp-fluorenyl complexes have the general formula:

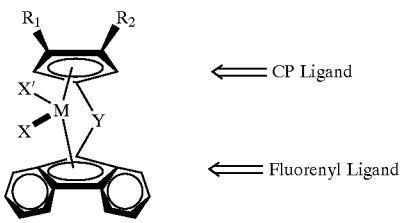

Formula 3 where M is a transition metal such as Ti, Hf, or Zr, $R_1$ and $R_2$ may be the same or different alkyl, alkylsilyl, or aryl, or substituted alkyl, alkylsilyl or aryl substituents of 1 to about 30 carbon atoms, or a ring thereof, and Y may be a bridging group preferably selected from a $C_1$–$C_4$ alkylidene radical and Ge, Si, P, B, or In radicals.

In a first aspect of the invention we have found surprisingly that when the Cp ligand is symmetric, e.g., $R_1=R_2=$a primary alkyl group such as a methyl group and $Y=(CH_3)_2C$ or $(CH_3)_2Si$, that atactic alternating copolymers of ethylene and alpha olefins are formed.

In a second aspect of the invention we have found that when the Cp ligand is assymetric, e.g., $R_1=$a primary or secondary alkyl and $R_2=H$, and $Y=(CH_3)_2C$ or $(CH_3)_2Si$, alternating, isotactic ethylene/alpha olefin copolymers are formed.

While not wishing to be bound by theory, we presently believe the alternating copolymerization of ethylene and alpha olefins with this latter class of catalysts ($R_1 \neq R_2$) proceeds by a novel mechanism whereby the catalyst interconverts between two states (state M and state M') with each monomer insertion. For catalysts where $R_1 \neq R_2$, the assymetry of the catalyst is such that the olefin inserts alternately at coordination sites A in state M and coordination site B in state M'. Since the coordination sites A and B are different, the kinetic selectivity of each site for insertion of the two comonomers can be controlled by suitable selection of $R_1$ and/or $R_2$ (that is, $R_1$ relative to $R_2$) such that in the presence of both monomers the insertion of monomer 1 at site A (state M) will predominate and the insertion of monomer 2 at site B (state M') will predominate. As the states alternate with each monomer insertion, this Cp ligand substituent selection results in control of the catalyst system to yield alternating copolymers of monomers 1 and 2 as set forth in Scheme 1 below:

Scheme 1, $R_1 \neq R_2$

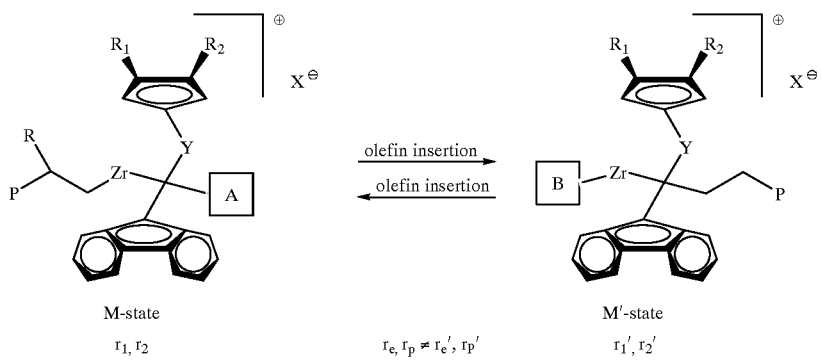

M-state  M'-state
$r_1, r_2$  $r_e, r_p \neq r_e', r_p'$  $r_1', r_2'$

Using the catalysts and process of the present invention, the copolymerization of olefins can be usefully described by a series of kinetic equations based on the well known Markov copolymerization statistics. By way of illustration, we derive these equations for ethylene/propylene copolymerization, but the approach is valid for other alpha olefins as well. For two states M and M' that interconvert with each olefin insertion, the rate of olefin insertion for two generic monomers E and P can be described by 8 equations:

$$M\text{-}E + E \xrightarrow{k_{11}} M'\text{-}E\text{-}E = M\text{-}E \quad \text{Eq. (1)}$$

$$M\text{-}E + P \xrightarrow{k_{12}} M'\text{-}P\text{-}E = M\text{-}P \quad \text{Eq. (2)}$$

$$M\text{-}P + E \xrightarrow{k_{21}} M'\text{-}E\text{-}P \quad \text{Eq. (3)}$$

$$M\text{-}P + P \xrightarrow{k_{22}} M'\text{-}P\text{-}P \quad \text{Eq. (4)}$$

$$M'\text{-}E + E \xrightarrow{k'_{11}} M\text{-}E\text{-}E \quad \text{Eq. (5)}$$

$$M'\text{-}E + P \xrightarrow{k'_{12}} M\text{-}P\text{-}E \quad \text{Eq. (6)}$$

$$M'\text{-}P + E \xrightarrow{k'_{21}} M\text{-}E\text{-}P \quad \text{Eq. (7)}$$

$$M'\text{-}P + P \xrightarrow{k'_{22}} M\text{-}P\text{-}P \quad \text{Eq. (8)}$$

where M—E and M—P are the active centers with the monomer E and P have previously inserted, respectively and $K_{11}$ is the rate constant for insertion of monomer E at site M—E, and $k_{12}$ is the rate constant of insertion of monomer P at site M—E, etc. The relative reactivities at the two states are defined by the reactivity ratios with $r_1=k_{11}/K_{12}$, $r_2=k_{22}/k_{21}$, $r'_1=k'_{11}/k'_{12}$, $r'_2=k'_{22}/k'_{21}$ for the M-state and M'-state respectively.

We have found that for catalysts where $R_1$=primary or secondary alkyl group and $R_2$=H, that alternating copolymers of ethylene and alpha olefins can be obtained where the kinetic selectivities at the two states of the catalysts are different (i.e., $r_1$, $r_2 \neq r_1'$, $r_2'$). For these copolymerization systems, copolymers which show triad distributions with up to 70% EPE and PEP triads can be easily produced.

In addition, for these catalysts the stereochemistry of the alpha olefin insertion is also controlled to give isotactic alternating copolymers. This can be readily established by $^{13}$C NMR spectroscopy. The $^{13}$C NMR signal of the PEPEP methyl group is split into 3 peaks which can be assigned to mm, rm+mr and rr orientation of adjacent methyl groups in alt E/P (L. Zetta, G. Gatti, G. Audisio Macromolecules 11, 763 (1978)). The relative intensity (estimated by multicomponent fit) of the mm-peak of polymers produced by [(3-MeCp)(Me$_2$C)(Flu)]ZrMe$_2$ (Metallocene 2) range from 61–71% indicating an isotactic alternating copolymer. Also, [(3-iPrCp)(Me$_2$C)(Flu)]ZrMe$_2$ (Metallocene 4) and [(Me$_2$Si)(MeCp)(Flu)]ZrCl$_2$ (Metallocene 5) produce isotactic E/P copolymers with mm=62–68% and mm=50–58%.

In contrast, polymers produced by [(3,4-Me$_2$Cp)(Me$_2$C)(Flu)]ZrMe$_2$ (Metallocene 3). show a favored formation of the mr dyad (41–54%) of the PEPEP signal with a small preference of the isotactic over the syndiotactic dyad (mm>rr). This indicates atactic alt E/P copolymers are produced.

Thus this invention provides a process not only for producing alternating copolymers, but also for controlling the tacticity of said alternating copolymers to range from atactic to highly crystalline isotactic copolymers.

The catalyst system of the present invention consists of the transition metal component metallocene in the presence of an appropriate cocatalyst. The examples disclose methods for preparing the metallocenes in high yield. Generally, the preparation of the metallocene consists of forming the cyclopentadienyl ligand, introducing the bridging group and the fluorenyl ligand, followed by metallation with the metal tetrahalide to form the metallocene complex to which the cocatalyst is added to form the catalyst system.

Appropriate cocatalysts include alkylaluminum compounds, methylaluminoxane, or modified methylaluminoxanes (herein MAO) of the type described in the following references: U.S. Pat. No. 4,542,199 to Kaminsky, et al.; Ewen, J. Am. Chem. Soc., 106 (1984), p. 6355; Ewen, et al., J. Am. Chem. Soc. 109 (1987) p. 6544; Ewen, et al., J. Am. Chem. Soc. 110 (1988), p. 6255; Kaminsky, et al, Angew. Chem., Int. Ed. Eng. 24 (1985), p. 507. Other cocatalysts which may be used include Lewis or protic acids, such as B(C$_6$F$_5$)$_3$ or [PhNMe$_2$H]$^+$B(C$_6$F$_5$)$^-_4$, which generate cationic metallocenes with compatible non-coordinating anions in the presence or absence of alkyl-aluminum compounds. Catalyst systems employing a cationic Group 4 metallocene and compatible non-coordinating anions are described in European Patent Applications 277,003 and 277,004 filed on Jan. 27, 1988 by Turner, et al.; European Patent Application 427,697-A2 filed on Oct. 9, 1990 by Ewen, et al.; Marks, et al., J. Am. Chem. Soc., 113 (1991), p. 3623; Chien, et al., J. Am. Chem. Soc., 113 (1991), p. 8570; Bochmann et al., Angew. Chem. Intl. Ed. Engl. 7 (1990), p. 780; and Teuben et al., Organometallics, 11 (1992), p. 362, and references therein.

In one of many embodiments, these catalyst systems can be placed on a suitable support such as silica, alumina, or other metal oxides, $MgCl_2$ or other supports. These catalysts can be used in the solution phase, in slurry phase, in the gas phase, or in bulk monomer. Both batch and continuous polymerizations can be carried out. Appropriate solvents for solution polymerization include liquified monomer, and aliphatic or aromatic solvents such as toluene, benzene, hexane, heptane, as well as halogenated aliphatic or aromatic solvents such as $CH_2Cl_2$, chlorobenzene, fluorobenzene, hexaflourobenzene or other suitable solvents. Various agents can be added to control the molecular weight, including hydrogen, silanes and metal alkyls such as diethylzinc.

The bridged fluorenyl metallocenes of the present invention, in the presence of appropriate cocatalysts, are useful for the co-polymerization of ethylene with alpha-olefins, such as propylene, 1-butene, 1-pentene, 4-methyl-1-pentene, 1-hexene, 1-octene, allyl trimethyl silane and combinations thereof. The polymerization of olefins is carried out by contacting the olefin(s) with the catalyst systems comprising the transition metal component and in the presence of an appropriate cocatalyst, such as an aluminoxane, or a Lewis acid such as $B(C_6F_5)_3$. In ethylene-propylene monomer systems, productivities in excess of 8 kg/g catalyst for the copolymerization has been attained.

DETAILED DESCRIPTION FOR CARRYING OUT THE INVENTION, INCLUDING THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what are presently believed to be the best modes of carrying out the inventions.

In this regard, the invention is illustrated in the several examples, and is of sufficient complexity that the many aspects, interrelationships, and sub-combinations thereof simply cannot be fully illustrated in a single example. For clarity and conciseness, several of the examples show, or report only aspects of a particular feature or principle of the invention, while omitting those that are not essential to or illustrative of that aspect. Thus, the best mode embodiment of one aspect or feature may be shown in one example or test, and the best mode of a different aspect will be called out in one or more other examples, tests, structures, formulas, or discussions.

I. Metallocene Synthesis

The following metallocenes: 1, [(3-tBuCp)(Me₂C)(Flu)]ZrMe₂; 2, [(3-MeCp)(Me₂C)(Flu)]ZrMe₂; and 4, [(3-iPrCp)(Me₂C)(Flu)]ZrMe₂, were prepared according to literature procedures (J. E. Ewen, R. L. Jones, A. Razavi, J. D. Ferrara, J. Am. Chem. Soc. 1988, 110, 6255–6., J. A. Ewen, M. J. Elder, R. L. Jones, L. Haspeslagh, J. L. Atwood, S. G. Bott, K. Robinson, *Makromol. Chem., Macromol. Symp.* 1991, 48/49, 253–295, A. Razavi, J. L. Atwood, *J. Organomet. Chem.* 1995, 497, 105–11, N. Herfert, G. Fink, *Makromol.Chem., Macromol.Symp.* 1993, 66, 157–178., J. A. Ewen, M. J. Elder in *Ziegler Catalysts* (Eds.; G. Fink, R. Mülhaupt, H. H. Brintzinger), Springer Verlag, Berlin, Heidelberg, 1995, pp 99–109, A. Razavi, J. L. Atwood, *J. Organomet. Chem.* 1996, 520, 115–120.)

EXAMPLE 1

Synthesis of [(3,4-Me₂Cp)(Me₂C)(Flu)]ZrMe₂ (Metallocene 3)

3,4,6,6' tetrainethylfulvene was prepared from 1,2-dimethylcyclopentadienyl-Li (W. Mengele, J. Diebold, C. Troll, W. Röll, H.-H. Brintzinger, *Organometallics* 1993, 12, 1931–1935). and acetone/pyrrolidine in methanol (3,4-Me₂Cp)(Me₂C)(Flu) was synthesized from 3,4,6,6' tetramethylfulvene and Li-fluorene following reported procedures (J. A. Ewen, M. J. Elder, R. L. Jones, L. Haspeslagh, J. L. Atwood, S. G. Bott, K. Robinson, *Makromol. Chem., Macromol. Symp.* 1991, 48/49, 253–295). $^1$H-NMR (400 MHz, $CDCl_3$): d=7.71 (d, 2H, arom.), 7.34–7.16 (m, 6H, arom.), 5.87 (s, 1H, CH), 4.09 (s, 1H, CH); 3.09 (s, 2H, $CH_2$), 2.01 (s, 3H, $CH_3$), 1.89 (s, 3H, $CH_3$), 1.01 (s, 6H, $CH_3$).

[(3,4-Me₂Cp)(Me₂C)(Flu)]ZrCl₂ was synthesized from Li-salt of the ligand and $ZrCl_4$ in $CH_2Cl_2$. The resulting red crystals were treated with 2.2 mol equivalent of MeLi in ether. Extraction with pentane gave [(3,4-Me₂Cp)(Me₂C)(Flu)]ZrMe₂ which was recrystallized once from toluene/pentane. $^1$H-NMR (400 MHz, $C_6D_6$): d=8.07 (d, 2H, arom.), 7.50 (d, 2H, arom.), 7.32 (m, 2H, arom.), 7.07 (m, 2H, arom.), 5.15 (s, 2H, CH), 1.89 (s, 6H, $CH_3$) and 1.87 (s, 6H, $CH_3$), −1.17 (s, 6H, $CH_3$). Anal. calc. for $C_{25}H_{28}Zr$ (M=419.75): C: 71.53%, H: 6.74% found: C: 71.27% H: 7.01%.

EXAMPLE 2

Synthesis of Me₂Si(MeCp)(Flu)ZrCl₂ (Metallocene 5)

1.75 g (0.020 mol) methylcyclopentadienyl Lithium was dissolved in 80 mL THF and was added dropwise to a solution of 5 g (0.019 mol) fluorenyldimethylsilylchlorid in 200 mL THF at room temperature and was stirred for 4 h. The solvent was removed under vacuo. The resulting oil was dissolved in 200 mL $Et_2O$ and treated with saturated $NH_4Cl$ and $H_2O$. The organic phase was dried over $Na_2SO_4$. Evaporation yields in 5.6 g (0.018 mol) of a yellow oil. It was dissolved in a mixture of hexane and ether 10:1 and filtered over silica. Yield: 5.1 g (0.017 mol). The $^1$H-NMR spectrum shows a mixture of isomers.

1.64 g (5.4 mmol) of the ligand was dissolved in 50 mL $Et_2O$ and 10.8 mmol of MeLi in $Et_2O$ was added. the red solution was stirred for 1 h. 1.26 g (5.4 mmol) $ZrCl_4$ were added and the mixture was stirred for 45 min. The solvent was removed under vacuum. The residual red solid was dissolved in 40 mL $CH_2Cl_2$ and crystallized at −30° C. Yield: 640 mg (1.38 mmol). The crude product was recrystallized once from $CH_2Cl_2$. $^1$H-NMR: 8.17(m) 2H, 7.64–7.52 (m) 4H, 7.22–7.28 (m) 2H (fluorenyl protons); 6.29 (s) 1H, 5.71 (bs) 1H, 5.24 (s) 1H (Cp protons), 2.12 (s) 3H (methyl on Cp); 1.16 (S) 3H, 1.14 (S) 3H (Me$_2$Si-bridge).

II. Polymerization

Method A. Ethylene and Propylene. Copolymerizations of ethylene and propylene were carried out in a mixture of 100 mL propene and 20 ml toluene with a constant supply of ethylene at a pressure sufficient to give the desired E/P feed ratio. The reactions were started by injecting a 20 mL solution of metallocenedimethyl and MAO in toluene under Ar-pressure into an autoclave charged with 100 ml of propene and saturated with ethene at a total pressure of 82–160 psig. Low conversion and constant total pressure ensured a constant monomer feed. After 30–60 min the reaction was quenched by injection of 20 mL methanol. The copolymers were precipitated in 200 mL methanol and dried at 40° C. under reduced pressure. Quantitative $^{13}$C-NMR spectra of 300 mg of polymer dissolved in 4 mL of a mixture of dichlorobenzene with 10% benzene-d$_6$ were used for compositional analyses. The monomer feed was calculated using the fugacity equation and the experimentally estimated fugacity coefficient for ethene and propene.(R. Kravchenko, R. M. Waymouth, *Macromolecules* 1998, 31, 1–6.)

Method B. Ethylene and Butene. 40 mL (23g) 1-butene were condensed at –78° C. in a volumetric flask and transferred into the –30° C. cooled autoclave which was purged with N$_2$ and 1-butene once. The autoclave was overpressurized with ethene at 30–35 psig total pressure and was equilibrated at 20° C. 10 mL catalyst solution containing 100–105 mg MAO and 0.7–1.2 mmol zirconocenedimethyl were injected with a single ended injection tube pressurized with 100 psig Ar. The total pressure was kept constant at 33–37 psig. The reaction was quenched after 0.5 h by injecting 10 mL MeOH. The copolymer was precipitated in 200 mL MeOH and dried at reduced pressure and 40° C. The copolymer composition was analyzed by $^{13}$C-NMR according to J. C. Randall, Macromol. Chem. Phys., 1989 C29, 201–317.

Method C. Ethylene and 4-methyl-1-pentene. 20 mL (13.3 g) 4-methyl-1-pentene were injected in the autoclave with 13 psig ethene pressure and equilibrated at 20° C. 10 mL catalyst solution containing 100–105 mg MAO and 0.7–1.2 mmol zirconocenedimethyl were injected with a single ended injection tube pressurized with 100 psig Ar. The total pressure was kept constant at 17 psig. The reaction was quenched after 0.5 h by injecting 10 mL MeOH. The copolymer was precipitated in 200 mL MeOH and dried at reduced pressure and 40° C. The copolymer composition was analyzed by $^{13}$C-NMR according K. Kimura, S. Yuasa, Y. Maru, Polymer 25, (1984).

EXAMPLES 3 TO 8

Copolymerization of Ethylene and Propylene with Metallocenes 1, 2, and 3

Polymerizations were carried out according to Method A and the results are presented Table 1. The corresponding calculated triad distributions and reactivity ratios are presented Table 2.

TABLE 1

Copolymerization of Ethylene and Propylene with Catalyst Systems of Metallocenes 1, 2 and 3/MAO

| Ex. | cat.[a]/ temp ° C. | %-E in feed | %-E in polymer | $r_1$[b] | $r_2$[b] | EEE | PEE + EEP | PEP | EPE | EPP + PPE | PPP | $M_n \cdot 10^3$ g/mol $(M_w/M_n)$[c] |
|---|---|---|---|---|---|---|---|---|---|---|---|---|
| 3 | 1/0 | 14.7 | 51 | 3.94 | 0.144 | 8.6 | 24.8 | 18.0 | 19.6 | 19.9 | 9.1 | 20.5 (2.4) |
| 4 | 1/20 | 9.7 | 44 | 4.62 | 0.111 | 5.5 | 19.3 | 19.2 | 16.8 | 23.6 | 15.6 | 48.0 (1.5) |
| 5 | 2/0 | 9.7 | 49 | 1.56 | 0.022 | 1.9 | 11.3 | 37.4 | 35.9 | 11.6 | 1.9 | 6.8 (1.8) |
| 6 | 2/20 | 7.2 | 48 | 2.07 | 0.022 | 2.0 | 10.4 | 35.4 | 35.8 | 13.0 | 3.4 | 5.9 (2.5) |
| 7 | 3/0 | 7.1 | 48 | 1.59 | 0.017 | 0.9 | 10.0 | 37.7 | 39.3 | 9.8 | 2.3 | 5.8 (2.3) |
| 8 | 3/20 | 5.0 | 51 | 4.29 | 0.011 | 2.8 | 15.3 | 33.2 | 37.1 | 8.6 | 3.0 | 9.3 (1.5) |

[a] $[Zr] = 6.4 * 10^{-6} - 1.76 * 10^{-5} M$; $[Al] = 1.3–1.4 * 10^{-2} M.\backslash$
[b] based on the dyad;
[c] by low temp. GPC.

Note that polymers produced from metallocene 1 are random copolymers (<40% PEP and EPE triads, combined), whereas polymers produced from metallocenes 2 and 3 are highly alternating (>70% PEP and EPE triads, combined). Moreover, the alternating copolymers from metallocene 2 are isotactic, whereas those from 3 are atactic.

TABLE 2

Calculated triad distribution and reactivity ratios, Metallocenes 1, 2 and 3

| Ex. | cat./ temp °C. | EEE | PEE + EEP | PEP | EPE | EPP + PPE | PPP | fit[a]/ $10^{-3}$ | | Reactivity Ratios | | |
|---|---|---|---|---|---|---|---|---|---|---|---|---|
| | | | | | | | | | $r_{11}$ | $r_{22}$ | $r_{12}$ | $r_{21}$ |
| 3 | 1/0 | 8.6 | 24.8 | 17.6 | 20.0 | 19.9 | 9.1 | 3.0[b] | 4.0 | 0.157 | 0.085 | 4.1 |
| 4 | 1/20 | 5.5 | 19.3 | 19.1 | 16.9 | 23.6 | 15.6 | 0.9[b] | 5.3 | 0.141 | 0.075 | 4.7 |
| | | | | | | | | | $r_1$ | $r_2$ | $r'_1$ | $r'_2$ |
| 5 | 2/0 | 0.9 | 10.6 | 37.4 | 35.9 | 13.6 | 1.6 | 7.0[c] | 1.14 | 0.048 | 1.88 | 0.012 |
| 6 | 2/20 | 2.3 | 12.7 | 35.4 | 35.8 | 11.9 | 2.0 | 8.9[c] | 2.01 | 0.12 | 6.54 | 0.005 |
| | | | | | | | | | $r_1$ | $r_2$ | | |
| 7 | 3/0 | 1.0 | 12.3 | 37.7 | 39.3 | 9.1 | 0.5 | 7.0[d] | 2.1 | 0.009 | | |
| 8 | 3/20 | 2.3 | 17.4 | 33.1 | 37.1 | 9.4 | 0.6 | 9.7[d] | 4.9 | 0.007 | | |

[a]chi-squared values;
[b]calculated by Markov model 2nd order;
[c]calculated by the switching model;
[d]calculated by Markov model 1st order

EXAMPLES 9 AND 10

Copolymerization of Ethylene and Propylene with Metallocene 4/MAO Catalyst System, Me$_2$C(3-iPrCp)(Flu)ZrMe$_2$/MAO Polymerizations were carried out according to Method A and are presented in Table 3. The corresponding experimental and calculated triad distributions and reactivity ratios are presented in Table 4. Note the close agreement between the experimental and calculated.

EXAMPLES 11 AND 12

Copolymerization of Ethylene and α-Olefins with Metallocene 2/MAO Catalyst System, [(Me$_2$C)(3-MeCp)(Flu)]ZrMe$_2$/MAO Polymerizations were carried out according to Method B and C and are presented in Table 5. Example 11 is with butene and Example 12 is ethylene with 4-methyl-1-pentene

TABLE 3

E/P-Copolymerization catalyzed by Metallocene 4/MAO Catalyst System, [(Me$_2$C)(3-iPrCp)(Flu)]ZrMe$_2$/MAO

| Ex. | temp. [° C.] | pres. [psig] | E:P in feed | %-E[a] in polymer | EE | EP | PP | $r_1$[b] | $r_2$[b] | $r_1 \times r_2$ | Prod.[c] | $M_n \cdot 10^3$ g/mol ($M_w/M_n$)[d] |
|---|---|---|---|---|---|---|---|---|---|---|---|---|
| 9 | 20 ± 1 | 162 ± 1 | 0.094 | 49.3 | 10.4 | 78.3 | 11.3 | 2.8 | 0.027 | 0.076 | 7485 | 23.0 (1.6) |
| 10 | 0 ± 1 | 102 ± 1 | 0.096 | 50.1 | 10.5 | 79.8 | 9.7 | 2.7 | 0.023 | 0.062 | 4960 | 26.6 (1.7) |

[a]monomer compositions were calculated from triad distribution;
[b]calculated from dyad distribution;
[c]Productivity = kg polymer/(mol [Zr] h);
[d]determined by GPC.

TABLE 4

Experimental and Calculated triad distributions and reactivity ratios for Metallocene 4/MAO

| Example | | EEE | PEE + EEP | PEP | EPE | PPE + EPP | PPP | fit $E^{-3}$ | $r_1$ | $r_2$ | $r'_1$ | $r'_2$ |
|---|---|---|---|---|---|---|---|---|---|---|---|---|
| 9 | exp. | 3.3 | 15.2 | 30.8 | 32.9 | 14.1 | 3.7 | | | | | |
| | calc. | 3.3 | 15.2 | 32.2 | 32.9 | 13.8 | 2.6 | 10.3 | 2.09 | 0.12 | 6.19 | 0.010 |
| 10 | exp. | 3.2 | 15.1 | 31.8 | 35.4 | 11.9 | 2.6 | | | | | |
| | calc. | 3.6 | 17.0 | 32.2 | 35.4 | 10.5 | 2.3 | 12.4 | 2.17 | 0.058 | 7.0 | 0.007 |

TABLE 5

E/α-olefin-Copolymerization catalyzed by
[(Me₂C)(3-MeCp)(Flu)]ZrMe₂/MAO

| Example | Method | Temp. °C. | E:O in feed | %-E[a] in polymer | EE | EO | OO | $r_1$[b] | $r_2$[b] | $r_1 \times r_2$ | Productivity[c] | $M_n \cdot 10^3$ g/mol $(M_w/M_n)$[d] |
|---|---|---|---|---|---|---|---|---|---|---|---|---|
| 11 | B | 20 ± 1 | 0.018 | 45.5 | 4.3 | 82.1 | 13.6 | 11.6 | 0.006 | 0.07 | 4030 | 17.5 (1.8) |
| 12 | C | 20 ± 1 | 0.03 | 49.3 | 12.9 | 74.4 | 12.7 | 11.5 | 0.01 | 0.12 | 9800 | 31.2 (1.6) |

[a]calculated from triads;
[b]calculated from diads;
[c]in kg polymer/(mol [Zr] hr);
[d]determined by GPC.

EXAMPLE 13 AND 14

Copolymerization of Ethylene and Propylene with Metallocene 5/MAO Catalyst System, [(Me₂Si)(2-MeCp)(Flu)]ZrMe₂/MAO Polymerizations were carried out according to Method A and are presented in Table 6. The corresponding experimental and calculated triad distributions and reactivity ratios are presented in Table 7. Note the close agreement between the experimental and calculated.

applicability, in that it is now possible to create an alternating isotactic or atactic structure of ethylene/alpha olefin polymers by selection of the nature and relative symmetry of the ligand substituents, and by the selection of bridge constituents of catalyst systems employing bridged metallocene components. The resulting polymers have very evident industrially useful properties, ranging from amorphous or isotactic gum elastomers to highly crystalline isotactic rigid polymers, including intermediate properties such as thermoplastic elastomers to flexible thermoplastics. Such

TABLE 6

E/P-Copolymerization catalyzed by Metallocene 5/MAO Catalyst System,
Me₂Si(2-MeCp)(Flu)ZrMe₂/MAO

| Ex. | Temp. [°C.] | pres. [psig] | E:P in feed | %-E[a] in polymer | EE | EP | PP | $r_1$[b] | $r_2$[b] | $r_1 \times r_2$ | Prod.[c] | $M_n * 10^3$ g/mol $(M_w/M_n)$[d] |
|---|---|---|---|---|---|---|---|---|---|---|---|---|
| 13 | 20 ± 1 | 140 ± 1 | 0.051 | 51.2 | 10.1 | 79.2 | 10.7 | 5.0 | 0.014 | 0.07 | 84000 | 84 (1.7) |
| 14 | 0 ± 1 | 92 ± 1 | 0.068 | 52.3 | 6.4 | 83.6 | 10.0 | 2.2 | 0.016 | 0.036 | 3000 | 92.5 (1.8) |

[a]monitor compositions were calculated from triad distribution;
[b]calculated from dyad distribution;
[c]kg polymer/(mol [Zr] h);
[d]by low temp. GPC.

TABLE 7

Experimental and Calculated triad distributions and reactivity ratios for Metallocene 5/MAO

| Ex | | EEE | PEE + EEP | PEP | EPE | PPE + EPP | PPP | fit[a] $E^{-3}$ | monomer reactivity ratios[b] $r_1$ | $r_2$ | $r'_1$ | $r'_2$ |
|---|---|---|---|---|---|---|---|---|---|---|---|---|
| 13 | exp. | 3.9 | 13.6 | 33.0 | 35.7 | 10.7 | 3.1 | | | | | |
| | calc. | 3.1 | 16.2 | 33.0 | 35.7 | 10.8 | 1.3 | 9.2 | 3.6 | 0.025 | 12.1 | 0.004 |
| 14 | exp. | 6.7 | 17.8 | 27.8 | 37.1 | 7.9 | 2.6 | | | | | |
| | calc. | 6.7 | 21.3 | 29.2 | 37.1 | 5.4 | 0.3 | 25.5 | 4.2 | 0.025 | 16.3 | 0.002 |

[a]chi-squared values;
[b]calculated by the switching model.

The alternating polymers of this invention range from tacky amorphous gum elastomers to tough rubbery materials to semicrystalline thermoplastics.

Industrial Applicability

It is evident that the polymers, and the catalyst systems and processes for their production have wide industrial products are recognized in industry to be useful for adhesives, films, fibers and castable and machinable products.

It should be understood that various modifications within the scope of this invention can be made by one of ordinary skill in the art without departing from the spirit thereof. We therefore wish this invention to be defined by the scope of the appended claims as broadly as the prior art will permit, and in view of the specification if need be.

We claim:

1. A metallocene polymerization component for polymerizing olefin monomers to produce polymers and copolymers comprising a symmetric bridged Cp flurorenyl metallocene complex of the formula:

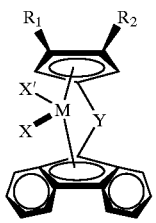

wherein:
- a) $R_1=R_2$ selected from substituted alkyl, alkylsilyl or aryl substituents of 1 to about 30 carbon atoms and may be connected in a ring;
- b) M is a Group 3, 4 or 5 Transition metal, a Lanthanide or an Actinide;
- c) X and X1 are the same or different uninegative ligand; and
- d) Y is a bridging group.

2. The metallocene polymerization catalyst component as in claim 1, wherein Y is a $C_1=C_4$ alkylidene radical and Ge, Si, P, B, or In radical.

3. The metallocene polymerization catalyst component as in claim 2 wherein said metallocene is $[(3,4-R_1, R_2 \text{ Cp})(Y)(\text{Flu})]\text{Zr X, X}^1$.

4. The metallocene polymerization catalyst component as in claim 3 wherein said metallocene is $[(3,4-\text{Me}_2\text{Cp})(\text{Me}_2\text{C})(\text{Flu})]\text{ZrMe}_2$.

* * * * *